3,272,696
PORFIROMYCIN INSECTICIDE
Paul W. O'Connell, Kalamazoo, Mich., assignor to The Upjohn Company, Kalamazoo, Mich., a corporation of Delaware
No Drawing. Filed Apr. 27, 1964, Ser. No. 362,940
15 Claims. (Cl. 167—30)

This invention pertains to a novel biological process and novel compositions. The invention is more particularly directed to the novel process for controlling insect pests with porfiromycin, and novel compositions comprising an insect nutriment or food with porfiromycin.

Porfiromycin is a biosynthetic compound produced by a species of actinomycete, Streptomyces ardus, NRRL 2817, under controlled culture conditions in a nutrient medium. Various methods for the production, recovery, and purification of porfiromycin are described in the published literature, e.g., C. De Boer et al., Antimicrobial Agents Annual, p. 17 (1960); and R. R. Herr et al., Antimicrobial Agents Annual, p. 23 (1960). Crystalline porfiromycin is characterized by form (triclinic) and color (dark purple). It melts at 201.5° C. (with decomposition;) has a molecular weight of about 344; and has a characteristic infrared absorption spectrum in mineral oil mull at the following frequencies: 3370, 3250, 3150, 3000, 1720, 1690, 1640, 1600, 1555, 1535, 1440, 1403, 1390, 1365, 1342, 1320, 1245, 1215, 1160, 1135, 1098, 1065, 1045, 1028, 1008, 975, 952, 918, 890, 848, 808, 782, 758, 729, 718, 692, and 675 cm.$^{-1}$. Porfiromycin is slightly soluble in water, moderately soluble in polar organic solvents, and substantially insoluble in hydrocarbon solvents. It is known to be useful as an antibiotic.

It has now been found, in accordance with the invention, that porfiromycin is an insect poison. It has been found that porfiromycin is a lethal poison for insects, but in less than lethal amounts causes reproductive sterility!

This newly discovered activity of porfiromycin provides a novel means for controlling insect pests by killing them and by preventing reproduction. When insects are rendered reproductively sterile with porfiromycin the females either fail to lay eggs or the eggs that are laid do not hatch. In the course of time, the adult insects age and die, the number of reproducing individuals become too small to maintain pestiferous populations, and control is thus achieved.

The insecticidal and insect sterilant properties of porfiromycin depend upon the susceptibilty of the various insects as well as the amount of porfiromycin used. In general, larger amounts of porfiromycin primarily effect mortality; whereas smaller amounts primarily effect sterilization. Hence, in accordance with practical economic considerations, porfiromycin is preferably used in the smaller amounts sufficient for sterilization. Used in the smaller amounts, a pestiferous population of insects is not wiped out immediately as when insecticidal amounts are used; but succeeding generations are significantly reduced in numbers and reproductive potential, and undesirable pests can even be completely eradicated.

Porfiromycin is active in low concentrations against mites, flies, mosquitoes, thrips, bean beetles, aphids, army worms, salt marsh caterpillars and other lepidopterous larvae. As used herein, the term "insect" is used in the same sense as in the Federal Insecticide, Fungicide, and Rodenticide Act of 1947 and refers generally to animals comprising the Phylum Arthropoda, illustratively, class Insecta, for example, orders Isoptera, Thysanoptera, Mallophaga, Hemiptera, Anoplura, Homoptera, Coleoptera, Lepidoptera, Orthoptera, Diptera, and Hymenoptera; and class Arachnida, for example, orders Araneae and Acarina.

In accordance with the process of the invention, insects are poisoned with porfiromycin by means of direct topical applications, ingestion, or residual contact. The compound can be used insecticidally and as a sterilant in its pure form, but for practical purposes it is preferred that the process be effected with dilute formulations of porfiromycin according to the invention, some of which are novel.

Insects susceptible to poisoning with porfiromycin are readily controlled by spraying or dusting them directly or by spraying or dusting plants, objects, or other environs where they feed, hide, congregate, or mate. For this purpose aqueous and organic solutions, dusts, wettable powders, emulsifiable concentrates, and other readily dispersible formulations are contemplated as useful embodiments for effecting the process of the invention. Aqueous and organic solutions of porfiromycin can be readily prepared by dissolving the compound in water or in a polar organic solvent such as methanol, ethanol, acetone, ethylene dichloride, and the like.

It is usually desirable, particularly in the case of aqueous spray formulations, to include adjuvants such as wetting agents, spreading agents, dispersing agents, stickers or adhesives, and the like, in accordance with usual agricultural practices. Any of the conventional wetting and dispersing agents of the anaonic, cationic, nonionic types that are commonly employed in compositions for application to plants can be used. Surfactants having sufficient wetting activity and therefore being suitable for the compositions of this invention include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl quaternary ammonium salts, sulfated fatty acid esters, sulfated fatty acid amides, glycerol mannitan laurate, polyalkylether condensates of fatty acids, lignin sulfonates, and the like. It will be understood, of course, that the sulfate and sulfonate compounds suggested above will preferably be used in the form of their soluble salts, e.g., sodium salts. All of these surfactants are capable of reducing the surface tension of water to less than about 40 dynes per centimeter in concentrations of about 1% or less.

Suitable stickers or adhesives include albumin, calcium caseinate, alkylphenoxy polyoxyethylene ethanol (Hyonic PE–50), coconut oil fatty acid modified phthalic polyglycerol copolymer (Triton B–1956), and the like.

Dusts are prepared by dispersing porfiromycin in an inert dusting power such as pyrophyllite, diatomite, clays such as bentonite, Georgia clay, Attapulgus clay, Barden clay, wood or walnut shell flour, and the like. Dusting powder is understood to be a solid material comminuted so that it has an average particle size of less than 50 microns, advantageously, less than 15 microns. The amount of porfiromycin active ingredient suitably present in a dusting powder formulation can vary advantageously from about 1% to about 90%, by weight, preferably about 1% to 25%, by weight. Illustratively, a dusting powder is obtained by mixing approximately equal parts of the active ingredient and pyrophyllite, comminuting either before or after the admixture as desired.

A wettable powder suitable for dispersing in an aqueous vehicle is obtained by adding a surfactant to a dusting powder. Suitable surfactants include sodium lauryl sulfate, sodium and calcium lignosulfonates, 1-tetradecyl-4-methylpyridinium chloride, Triton X–100 (isooctylphenoxy polyethoxy ethanol), and Pluronic F–68 (ethylene oxide-propylene glycol condensate, nonionic surfactant). If desired, the surfactant can be incorporated in the dry mixture either by dry milling or by adding it in solution in a volatile solvent such as ethanol or acetone, mixing to form a paste, drying, and milling.

For convenience in handling, porfiromycin can be prepared with or without adjuvants in the form of concentrated solutions in a solvent, for example, acetone, ethyl acetate, dimethylformamide, dimethylacetamide, dimethyl sulfoxide, acetonitrile, cyclohexanone, and similar polar solvents. Such concentrates can be dispersed in a suitable volume of an aqueous medium in the presence of a surfactant such as those disclosed above to give a mixture of any desired concentration. The surfactant can be included in a concentrated solution of the active ingredient in a solvent to give an emulsifiable concentrate, or it can be added separately when the aqueous dispersion is being prepared.

For the most part, low concentrations of porfiromycin are effective, and the concentration in formulations for direct application can range from about 50 to about 10,000 p.p.m. For example, excellent sterilizing action on Colorado potato beetle, *Leptinotarsa decemlineata* Say, has been obtained using concentrations of active ingredient ranging from about 100 to 500 p.p.m. For example, an emulsifiable concentrate comprising 5% (by weight) of the compound can be admixed with an aqueous medium in the proportions of two teaspoonfuls (about 10 cc.) of concentrate with one gallon of medium to give a mixture containing 120 to 150 parts of active ingredient per million parts of water. Similarly, three pints of a 5% concentrate mixed with 100 gals. of water provides about 180 p.p.m. of active ingredient. In the same manner, more concentrated solutions of active ingredient in a solvent can be incorporated with an appropriate quantity of an aqueous medium or petroleum base carrier, e.g. summer oil, kerosene, and like vehicles, to give a dispersible mixture of desired concentration.

A suitable wettable powder formulation is obtained by blending and milling 327 lbs. of Georgia clay, 4.5 lbs. of Triton X-100 as a wetting agent, 9 lbs. of a polymerized sodium salt of a substituted benzoid long-chain sulfonic acid (Daxad 27) as a dispersing agent, and 113 lbs. of porfiromycin. The resulting formulation has the following percentage composition (parts herein are by weight unless otherwise specified):

|  | Percent |
|---|---|
| Porfiromycin | 25 |
| Triton X-100 | 1 |
| Daxad 27 | 2 |
| Georgia clay | 72 |

This formulation, when dispersed in water at one pound per 100 gals., gives a spray formulation containing about 0.03% (300 p.p.m.) active ingredient.

A suitable emulsifiable concentrate is obtained by admixing the following materials:

|  | Parts |
|---|---|
| Porfiromycin | 15 |
| Xylene | 81.5 |
| Dodecylbenzene sodium monosulfonate | 1.75 |
| Condensation product of one mole of octylphenol and about 12 moles of ethylene oxide | 1.75 |

The mixture of dodecylbenzene sodium monosulfonate and condensation product is added to the xylene, and the porfiromycin is then added. This formulation, when dispersed in water at the rate of one pint per 100 gals., gives a spray formulation containing about 0.02% (200 p.p.m.) active ingredient.

Porfiromycin can also be formulated in relatively dilute proportions in a dispersible insecticide carrier for household applications. Thus, the compound can be formulated in dusts having from about 0.1% to 5.0% active ingredient with a dusting powder as hereinbefore described, and in solutions containing from about 0.01% to about 5.0% active ingredient with deodorized kerosene for aerosol applications.

It will of course be appreciated that the conditions encountered when applying the method and compositions of this invention to actual practice can vary widely. Included among the variables that may be encountered are the degree of infestation by insects, the particular insect to be controlled, the particular plant being treated, the degree of development of the plant, the prevailing weather conditions, such as temperature, relative humidity, rainfall, dews, and so forth.

A preferred method for effecting the reproductive sterility in accordance with the invention employs a novel formulation comprising a solid or liquid carrier diluent for the porfiromycin comprising an insect nutriment or food which stimulates insects to ingest the formulation and coincidently the active ingredient. If desired, the insect nutriment or food may suitably constitute the whole or substantial part of the carrier diluent. Granulated corn meal, bran, pomace, granulated sugar, and the like are suitable solid carrier diluents. Corn syrup, honey, molasses, and the like are suitable liquid carriers. Illustrative carrier diluents include one prepared by mixing 4 parts granulated sugar and 1 part orange juice crystals, and another prepared by mixing 6 parts powdered milk, 6 parts sugar, and 1 part powdered egg.

In general, suitable insect nutriments or foods for carrier diluents include carbohydrates, for example, sugars such as lactose, sucrose, fructose, glucose, and the like, and polymerized sugars such as starches, dextrins, pectins, and the like, and plant and animal proteins or protein degradation products such as egg albumen, meats, soybean oil meal, cottage cheese, proteoses, peptones, peptides, and the like.

The formulations of this invention containing insect nutriments or food for ingestion by insects may also be or contain an insect attractant for luring insects to the formulation containing the active ingredient. Suitable attractants include sec-butyl 6-methyl-3-cyclohexene-1-carboxylate (for Mediterranean fruit fly), sec-butyl 4 (or 5)-chloro-6-methyl-cyclohexanecarboxylate, methyleugenol 4-(p-acetoxyphenyl)-2-butanone, anisylacetone, and the like.

The following examples are illustrative of the process and compisitions of the present invention, but they are not to be construed as limiting.

*Example 1*

Four cages providing 512 in.$^3$ of free space were stocked with substantially equal numbers of incubating Mexican fruit fly eggs, *Anastrepha ludens* Loew. The stocked cages were kept in an exhaust-ventilated room at about 25° C. When the eggs began to hatch, a synthetic diet was provided the newly emerged larvae. The basic diet consisting of 4 parts granulated sugar and 1 part orange juice crystals was fed to the larvae in one cage maintained as normal controls. The three other cages were fed 0.01 percent, 0.05 percent, and 0.1 percent levels of porfiromycin, respectively, in the basic diet. Feeding was continued over an interval of 20 consecutive days. The female flies were stripped of eggs at 13 and 20 days of age and the eggs were incubated and hatchability noted. Further evaluation of the affects of porfiromycin was obtained by observing adult fly mortality and egg production. Notably, it was found that the diet containing 0.01 percent porfiromycin caused about 1 percent mortality of the male flies within 20 days, but none of the female flies died. Egg production of these females was normal, but hatachability was only 1.3 percent.

The diet containing 0.05 percent profiromycin also produced about 1 percent mortality of male flies, and no mortality of female flies. In this case, however, the female flies did not produce eggs! At the 0.1 percent concentration of porfiromycin there was no mortality and no egg production.

*Example 2*

Adult screw-worm flies, *Cochliomyia hominivorax* Coquerel, beginning not over 24 hours from emergence, were fed a freshly prepared sugar syrup containing 1 percent porfiromycin for 5 days. On the 8th day, the females were permitted to deposit their eggs, and the eggs were incubated for determination of percentage hatchability. The female flies so treated were not very productive of eggs and only 2 percent (expressed as percentage of control of female flies which laid eggs) were functional. None of the few eggs hatched.

Example 3

Two populations of about 300 to 500 house flies, *Musca domestica* Linnaeus, were treated and observed as follows: One population was fed a dry diet consisting of 6 parts powdered milk, 6 parts sugar, and 1 part powdered egg. Water was also provided in a separate dish ad libitum. The other population was fed 1.0 percent porfiromycin in the same basic diet with water ad libitum. After the female flies of both populations had laid their eggs (7 to 9 days after the experiment began), 0.06 g. of eggs from each population was incubated to hatching. The eggs from the normal untreated population hatched substantially 100 percent, whereas the porfiromycin treated population hatched only 1 percent.

Example 4

In a field test, 10 kg. of a diluent carrier consisting of 6 parts powdered milk, 6 parts corn syrup, and 1 part powdered egg and water was thoroughly mixed with 10 g. of porfiromycin and portions were spread out in shallow pans placed at various sites in a large, relatively isolated dairy feed lot and barn. Within 3 months, the population of house flies and faceflies had declined to the point that very few were seen on the premises.

Example 5

A 4' x 6' plot of 28-day old bean plants was thoroughly sprayed with a wettable powder spray containing 1 percent porfiromycin. After the leaves had dried, adult strawberry spider mites, *Tetranychus atlanticus*, were released on the leaves in numbers sufficient to infest the plants. The plants were carefully inspected daily for eggs, young mites, and the adults. After 5 to 7 days few young mites were found, several plants having eggs deposited on the leaves removed for observation did not hatch, and the population of adult mites was decreasing. Within 3 weeks the plot was substantially free of the spider mites.

I claim:
1. The process of rendering insects reproductively sterile which comprises inducing insects to ingest an effective amount of profiromycin.
2. The process of rendering insects reproductively sterile which comprises insects to ingest an effective amount of porfiromycin.
3. The process of claim 1 wherein dipterous insects are controlled.
4. The process of claim 2 wherein dipterous insects are made reproductively sterile.
5. The process of rendering insects reproductively sterile which comprises inducing insects to ingest an effective amount of a composition comprising 0.005 percent to 1.0 percent porfiromycin, a nutriment and a carrier diluent.
6. The process of claim 5 wherein the nutriment is a carbohydrate.
7. The process of claim 3 wherein Mexican fruit flies, *Anestrepha ludens* Loew, are controlled.
8. The process of claim 7 wherein Mexican fruit flies are made reproductively sterile.
9. The process of claim 3 wherein house flies, *Musca domestica* Linnaeus, are controlled.
10. The process of claim 9 wherein the house flies are made reproductively sterile.
11. The process of claim 3 wherein screw-worm flies, *Cochliomyia hominivorax* Coquerel, are controlled.
12. The process of claim 11 wherein the screw-worm flies are made reproductively sterile.
13. Composition for rendering insects reproductively sterile which comprises from about 0.01 to about 1.0 percent porfiromycin, as the essential active ingredient, and a carrier diluent comprising an insect nutriment.
14. Composition according to claim 13 and an insect attractant.
15. Composition for rendering dipterous insects reproductively sterile which comprises about 0.01 to about 1.0 percent porfiromycin as the essential active ingredient, and a carrier diluent consisting of powdered milk, sugar, and powdered egg.

No references cited.

JULIAN S. LEVITT, *Primary Examiner.*
JEROME D. GOLDBERG, *Assistant Examiner.*

UNITED STATES PATENT OFFICE
CERTIFICATE OF CORRECTION

Patent No. 3,272,696                          September 13, 1966

Paul W. O'Connell

It is hereby certified that error appears in the above numbered patent requiring correction and that the said Letters Patent should read as corrected below.

Column 6, lines 1, 2 and 3, for "The process of rendering insects reproductively sterile which comprises inducing insects to ingest an effective amount of profiromycin" read -- The process of controlling insects which comprises applying to said insects an effective amount of porfiromycin --; lines 6 and 7, for "sterile which comprises insects" read -- comprises inducing insects --.

Signed and sealed this 29th day of August 1967.

(SEAL)
Attest:

ERNEST W. SWIDER                          EDWARD J. BRENNER
Attesting Officer                              Commissioner of Patents